(12) United States Patent
Ogawa (10) Patent No.: US 11,407,064 B2
(45) Date of Patent: Aug. 9, 2022

(54) ENERGY STORAGE DEVICE AND METHOD OF MANUFACTURING ENERGY STORAGE DEVICE

(71) Applicant: LITHIUM ENERGY AND POWER GMBH & CO. KG, Stuttgart (DE)

(72) Inventor: Yusuke Ogawa, Kyoto (JP)

(73) Assignees: GS YUASA INTERNATIONAL LTD., Kyoto (JP); ROBERT BOSCH GMBH, Stuttgart (DE)

( * ) Notice: Subject to any disclaimer, the term of this patent is extended or adjusted under 35 U.S.C. 154(b) by 879 days.

(21) Appl. No.: 16/317,004

(22) PCT Filed: Jul. 6, 2017

(86) PCT No.: PCT/EP2017/066914
§ 371 (c)(1),
(2) Date: Jan. 10, 2019

(87) PCT Pub. No.: WO2018/011049
PCT Pub. Date: Jan. 18, 2018

(65) Prior Publication Data
US 2019/0299332 A1      Oct. 3, 2019

(30) Foreign Application Priority Data

Jul. 14, 2016    (JP) .............................. JP2016-139836

(51) Int. Cl.
| | |
|---|---|
| *H01M 4/02* | (2006.01) |
| *B23K 26/21* | (2014.01) |
| *B23K 26/082* | (2014.01) |
| *B23K 26/20* | (2014.01) |
| *B23K 26/28* | (2014.01) |

(Continued)

(52) U.S. Cl.
CPC ............ *B23K 26/21* (2015.10); *B23K 26/082* (2015.10); *B23K 26/206* (2013.01); *B23K 26/28* (2013.01);

(Continued)

(58) Field of Classification Search
CPC ..................................................... H01M 4/02
See application file for complete search history.

(56) References Cited

U.S. PATENT DOCUMENTS

| | | |
|---|---|---|
| 2004/0265683 A1 | 12/2004 | Merrill et al. |
| 2006/0207085 A1 | 9/2006 | Nakagawa et al. |
| 2015/0024260 A1 | 1/2015 | Kwak et al. |

FOREIGN PATENT DOCUMENTS

| | | |
|---|---|---|
| JP | H 09-122956 A | 5/1997 |
| JP | 2001-043845 A | 2/2001 |

(Continued)

OTHER PUBLICATIONS

International Search Report (ISR) (PCT Form PCT/ISA/210), in PCT/EP2017/066914, dated Nov. 7, 2017.

*Primary Examiner* — Jacob B Marks
(74) *Attorney, Agent, or Firm* — McGinn IP Law Group, PLLC (57) ABSTRACT

An energy storage device is equipped with a container having a container body and a lid body, which closes an opening of the container body. An elongated welded part which is a welded portion between the container body and the lid body, is formed on the container. The welded part has a first welded part and a second welded part arranged in a row in a lengthwise direction of the welded part, wherein a width of the second welded part in a widthwise direction of the welded part is set larger than a width of the first welded part in the widthwise direction. A gas release vent is disposed on the lid body, wherein the second welded part is disposed on a lateral side of the gas release vent, and a length of the second welded part in the lengthwise direction is set larger than a length of the gas release vent in the lengthwise direction.

4 Claims, 7 Drawing Sheets

(51) Int. Cl.
- *H01M 50/30* (2021.01)
- *H01M 50/103* (2021.01)
- *H01M 50/169* (2021.01)
- *H01M 50/342* (2021.01)
- *H01M 50/00* (2021.01)
- *B23K 101/12* (2006.01)
- *B23K 101/36* (2006.01)

(52) U.S. Cl.
CPC ......... *H01M 50/00* (2021.01); *H01M 50/103* (2021.01); *H01M 50/169* (2021.01); *H01M 50/30* (2021.01); *H01M 50/3425* (2021.01); *B23K 2101/12* (2018.08); *B23K 2101/36* (2018.08)

(56) References Cited

FOREIGN PATENT DOCUMENTS

| | | | |
|---|---|---|---|
| JP | 2003-000386 A | | 1/2003 |
| JP | 2003-031186 | * | 1/2003 |
| JP | 2006-260883 A | | 9/2006 |
| JP | 2010-205441 A | | 9/2010 |
| JP | JP 2010-238558 A | | 10/2010 |
| JP | 2011-129266 A | | 6/2011 |
| JP | 2015-023025 A | | 2/2015 |
| JP | 2015-030011 A | | 2/2015 |
| JP | 2015-111573 A | | 6/2015 |
| KR | 10-2012-0033392 A | | 4/2012 |
| WO | WO 2015/107664 A1 | | 7/2015 |

\* cited by examiner

ENERGY STORAGE DEVICE AND METHOD OF MANUFACTURING ENERGY STORAGE DEVICE

TECHNICAL FIELD

The present invention relates to an energy storage device equipped with a container, and a method of manufacturing an energy storage device.

BACKGROUND ART

Conventionally, an energy storage device such as a lithium ion secondary battery includes a container and an electrode assembly housed in the container, and performs charging and discharging through electrode terminals disposed on the container.

In the energy storage device having such a structure, the container is formed of a container body and a lid body, for example. In a state where elements such as the electrode assembly are housed in the container body, the lid body and a peripheral edge of an opening of the container body are joined to each other by laser welding or the like. To be more specific, in laser welding, a laser beam is irradiated to a butting portion (boundary portion) between the lid body and an opening of the container body so that metal in such a portion is melted whereby the lid body and the container body are joined to each other.

For example, patent document 1 discloses a laser welding method of welding an upper lid of a battery case by a laser. In this laser welding method, a laser beam is oscillated around one point on a vertical line which passes the center of the upper lid of the battery case as a center so that a laser beam is irradiated obliquely toward an outer side of the battery case, that is, to an edge portion of the upper lid and, at the same time, the laser beam is moved along the edge portion. With such an operation, the upper lid can be welded to a box body at a high speed.

PRIOR ART DOCUMENT

Patent Document

Patent Document 1: JP-A-9-122956

SUMMARY OF THE INVENTION

Problems to be Solved by the Invention

In general, when welding for joining two members is performed at a high speed, there may arise a state where a joint strength becomes insufficient due to a shortage of melting amount of metal, for example. On the other hand, when welding is performed spending a considerable time, although a joint strength between two members is enhanced, manufacturing efficiency may be lowered. Accordingly, the manner of welding a container body and a lid body which form a container of an energy storage device is important for efficiently manufacturing an energy storage device having high quality.

The present invention has been made in view of the above-mentioned drawbacks, and it is an object of the present invention to provide an energy storage device which includes a container formed by joining a container body and a lid body by welding and having high quality, and a method of manufacturing such an energy storage device.

Means for Solving the Problems

To achieve the above-mentioned object, an energy storage device according to an aspect of the present invention is an energy storage device equipped with a container having a container body and a lid body which closes an opening of the container body, wherein an elongated welded part which is a welded portion between the container body and the lid body is formed on the container, the welded part has a first welded part and a second welded part arranged in row in a lengthwise direction of the welded part, a width of the second welded part in a widthwise direction of the welded part is set larger than a width of the first welded part in the widthwise direction, a gas release vent is disposed on the lid body, the second welded part is disposed on a lateral side of the gas release vent, and a length of the second welded part in the lengthwise direction is set larger than a length of the gas release vent in the lengthwise direction.

With such a configuration, the elongated welded part has the second welded part having a larger width than the first welded part and hence, it is possible to enhance a joint strength between the container body and the lid body, for example, at least at a portion where the second welded part is formed. Accordingly, for example, it is possible to enhance reliability of joining of a portion of the lid body which is liable to be affected by the increase of an internal pressure in the container while suppressing lowering of efficiency of an entire welding operation.

To be more specific, the portion of the lid body where the gas release vent is disposed has lower rigidity than other portions and hence, such a portion is a portion which is liable to be affected by the increase of an internal pressure in the container, for example. According to the energy storage device of this aspect, the second welded part which is formed with a large width and is longer than the gas release vent is disposed on a lateral side of the gas release vent and hence, resistance of the lid body against the increase of an internal pressure in the container can be enhanced.

In the energy storage device according to one aspect of the present invention, the second welded part may be disposed at a position where the second welded part includes an entire length of the gas release vent in the lengthwise direction as viewed from the lateral side.

With such a configuration, the second welded part exists on the entire region on the lateral side of the gas release vent and hence, a force for fixing a portion of the lid body having low rigidity to the container body can be further enhanced. Accordingly, reliability of the container is further enhanced.

In the energy storage device according to one aspect of the present invention, assuming a length of the welded part in the lengthwise direction as L, a length of the second welded part may be set to a value which falls within a range of from 0.2 L to 0.8 L inclusive.

With such a configuration, for example, a range of the second welded part is limited to a portion where the further increase of a joint strength between the container body and the lid body is desirable, such as a center portion of the elongated lid body. Accordingly, it is possible to acquire both of the suppression of lowering of efficiency of an entire welding operation and the enhancement of reliability of the container.

A method of manufacturing an energy storage device according to an aspect of the present invention is a method of manufacturing an energy storage device equipped with a container having a container body and a lid body which closes an opening of the container body, wherein the method includes a welding step of forming a welded part which is a welded portion between the container body and the lid body and includes a first welded part and a second welded part disposed in a row in a lengthwise direction of the welded part, and the welding step includes: a straight-line welding step of forming the first welded part by advancing an irradiation position of a laser beam (laser light) relatively straightforward along a straight-line-shaped butting portion between the container body and the lid body; and a non-straight-line welding step of forming the second welded part by moving the irradiation position of the laser beam with respect to the butting portion and along the butting portion and, at the same time, by moving the irradiation position in a direction which intersects with a direction of moving of the irradiation position along the butting portion.

According to such a manufacturing method, it is possible to form a straight-line-shaped welded part as a whole while having a large width at a portion by changing the irradiation position of a laser beam to the container. For example, while irradiating a laser beam from the laser unit, by controlling an irradiation position of the laser beam to the container, it is possible to form the welded part including the first welded part and the second welded part in a series of operations. That is, it is possible to efficiently manufacture an energy storage device having high quality.

Advantages of the Invention

According to the present invention, it is possible to provide an energy storage device equipped with a container where a container body and the lid body are joined to each other by welding and having high quality, and a method of manufacturing such an energy storage device.

MODE FOR CARRYING OUT THE INVENTION

Hereinafter, the energy storage device of the embodiment of the present invention is described with reference to drawings. The respective drawings are schematic views, and are not always described strictly accurately.

The embodiment described hereinafter is one preferred specific example of the present invention. In the embodiment described hereinafter, shapes, materials, constitutional elements, the arrangement positions and connection states of the constitutional elements, the order of manufacturing steps and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements.

First, an overall configuration of an energy storage device 10 of the embodiment is described with reference to FIG. 1 and FIG. 2.

Figure 1:
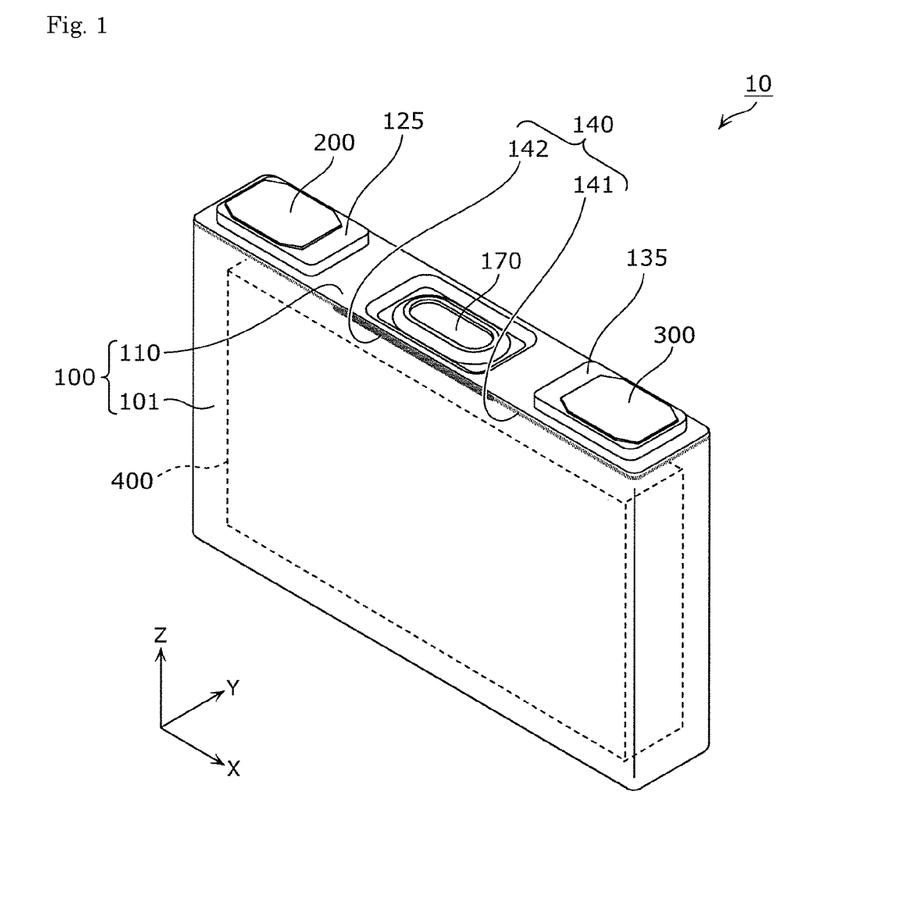
FIG. 1 is a perspective view showing an external appearance of an energy storage device according to an embodiment.

FIG. 1 is a perspective view showing an external appearance of the energy storage device 10 of the embodiment. FIG. 2 is a perspective view showing a state of a container body 101 and a lid body 110 which the energy storage device 10 of the embodiment includes before the container body 101 and the lid body 110 are connected to each other by welding. In FIG. 2, the illustration of elements housed in the container 100 such as an electrode assembly 400 is omitted.

In FIG. 1 and the succeeding drawings, for the sake of convenience, the description is made while assuming a Z axis direction as a vertical direction. However, in an actual use state, there may be also a case where the Z axis direction and the vertical direction do not agree with each other.

The energy storage device 10 is a secondary battery which can charge electricity or discharge electricity. To be more specific, the energy storage device 10 is a nonaqueous electrolyte secondary battery such as a lithium ion secondary battery. The energy storage device 10 is applicable to an electric vehicle (EV), a hybrid electric vehicle (HEV), a plug-in hybrid electric vehicle (PHEV) or the like, for example.

Further, the energy storage device 10 may be also applicable to an UPS (uninterruptible power supply systems), an energy storage apparatus for storing natural energy, an energy storage apparatus for storing regenerative energy generated in an electric train or the like (installed inside or outside a railcar), an engine starting energy storage apparatus, an AGV (automated guided vehicle) or the like.

The energy storage device 10 is not limited to a nonaqueous electrolyte secondary battery, and may be a secondary battery other than the nonaqueous electrolyte secondary battery, and may be a capacitor.

Figure 2:
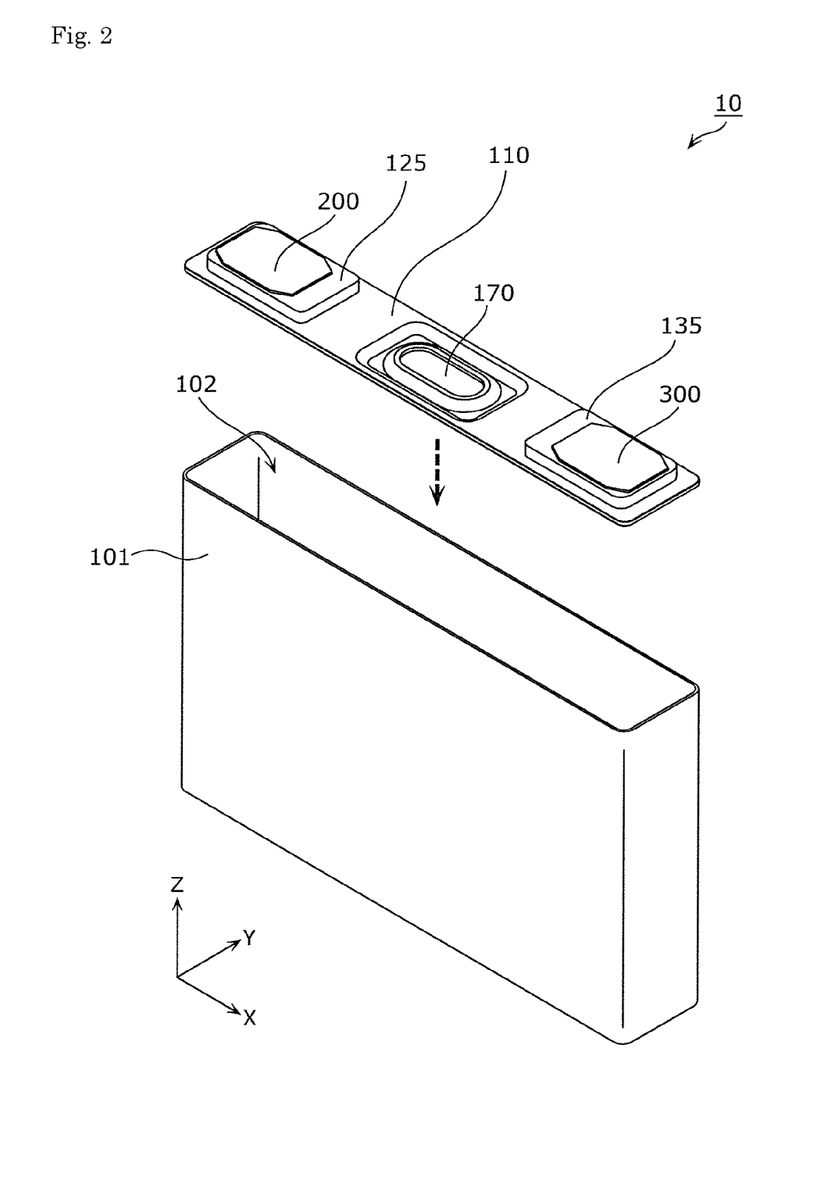
FIG. 2 is a perspective view showing a state of a container body and a lid body which the energy storage device of the embodiment includes before the container body and the lid body are connected to each other by welding.

As shown in FIG. 1 and FIG. 2, the energy storage device 10 includes: the container 100; a positive electrode terminal 200; and a negative electrode terminal 300. An electrode assembly 400 is housed in the inside of the container body 101 which the container 100 includes, and the lid body 110 is disposed so as to close an opening 102 of the container body 101. In FIG. 1, the electrode assembly 400 is conceptually shown by a rectangular parallelepiped body indicated by a broken line, and a shape and a size of the electrode assembly 400 are not limited to a shape and a size shown in FIG. 1.

The container 100 is formed of the bottomed container body 101 having a rectangular cylindrical shape; and the lid body 110 which is a plate-like member mounted on the container body 101 so as to close the opening 102 of the container body 101. The container 100 has the structure where the inside of the container 100 is hermetically sealed by joining the lid body 110 and the container body 101 to each other by welding after the electrode assembly 400 and the like are housed in the inside of the container 100.

As a material for forming the lid body 110 and a material for forming the container body 101, for example, weldable metal such as stainless steel, aluminum, or an aluminum alloy is adopted.

To be more specific, the container 100 is formed such that a peripheral edge of the lid body 110 is placed on an upper end surface of the container body 101 on which the opening 102 is formed and, then, the lid body 110 and the container body 101 are joined to each other by welding using a laser beam (laser light) irradiated from the side of the lid body 110 and the container body 101 in such a state.

For example, as shown in FIG. 1, on a long-side surface on a viewer's side (on a minus side in a Y axis direction) of the container 100, an elongated welded part 140 which is a welded portion between the container body 101 and the lid body 110 is formed. The welded part 140 has a first welded part 141 and a second welded part 142 arranged in a row in a lengthwise direction (in this embodiment, in the X axis direction). In FIG. 1 and the succeeding drawings, to facilitate distinguishing of the first welded part 141 and the second welded part 142 from each other, different patterns are given to the first welded part 141 and the second welded part 142 respectively. The welding step and the like at the time of forming the welded part 140 are described later using FIG. 3 and FIG. 8.

The lid body 110 includes a gas release vent 170. The gas release vent 170 is provided to the energy storage device 10 as a safety mechanism which opens when an internal pressure of the container 100 is increased and releases a gas in the container 100 to the outside. For example, the gas release vent 170 is formed by decreasing a wall thickness of a portion of a metal plate which is a material for forming the lid body 110 by press-working. A mode of the gas release vent is not particularly limited. For example, a gas release vent may be formed on the lid body 110 by disposing a metal plate provided as a separate body from the lid body 110 so as to close a hole formed in the lid body 110.

The electrode assembly 400 is a member which includes a positive electrode plate, a negative electrode plate, and a separator, and can store electricity. In this embodiment, the energy storage device 10 includes the winding-type electrode assembly 400 which is formed by winding the positive electrode plate and the negative electrode plate with the separator interposed between the positive electrode plate and the negative electrode plate. The electrode assembly 400 is housed in the container body 101 such that a winding axis of the electrode assembly 400 is directed in a direction connecting the lid body 110 and a bottom surface of the container body 101 to each other, that is, in a posture that the winding direction becomes parallel to the Z axis direction in this embodiment.

The positive electrode terminal 200 is an electrode terminal which is electrically connected to a positive electrode of the electrode assembly 400 through a positive electrode current collector (not shown in the drawing). The negative electrode terminal 300 is an electrode terminal which is electrically connected to a negative electrode of the electrode assembly 400 through a negative electrode current collector (not shown in the drawing). That is, the positive electrode terminal 200 and the negative electrode terminal 300 are respectively formed of a metal-made electrode terminal for deriving electricity stored in the electrode assembly 400 to a space outside the energy storage device 10 or for introducing electricity into a space inside the energy storage device 10 for storing electricity in the electrode assembly 400. That is, the positive electrode terminal 200 and the negative electrode terminal 300 are respectively formed of an electrode terminal used for discharging electricity from the energy storage device 10 and charging electricity to the energy storage device 10.

The positive electrode terminal 200 is mounted on the lid body 110 by way of a gasket 125 having an insulation property, and the negative electrode terminal 300 is mounted on the lid body 110 by way of a gasket 135 having an insulation property. A gasket not shown in the drawing is disposed also on a back side (a minus side in the Z axis direction) of each gasket 125, 135 with the lid body 110 interposed therebetween.

The energy storage device 10 may include, besides the above-mentioned constitutional elements, spacers with which the space inside the container 100 is filled, an insulation film which embraces the electrode assembly 400 and the like. Although a liquid such as an electrolyte solution (nonaqueous electrolyte) is sealed in the container 100 of the energy storage device 10, the illustration of such a liquid is omitted. As an electrolyte solution sealed in the container 100, a kind of the electrolyte solution is not particularly limited and any kind of electrolyte solution can be selected from various kinds of electrolyte solutions provided that performance of the energy storage device 10 is not impaired.

As has been described heretofore, the energy storage device 10 of this embodiment includes the container 100 which houses the electrode assembly 400 and the like therein, and the container 100 has the container body 101, and the lid body 110 which closes the opening 102 of the container body 101. To be more specific, the lid body 110 and the container body 101 are joined to each other by welding so that an elongated welded part 140 is formed on the container 100.

The welded part 140 has first welded parts 141 and a second welded part 142 which differ from each other in width in a widthwise direction (in the Z axis direction in this embodiment). Steps for forming the welded part 140, advantageous effects obtained by the welded part 140 and the like are described hereinafter with reference to FIG. 3 to FIG. 8.

Figure 3:
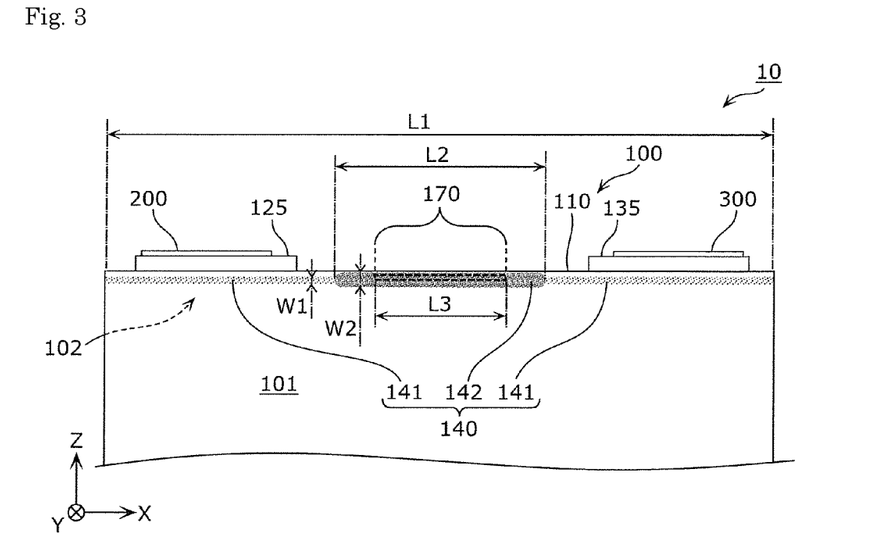
FIG. 3 is a side view showing a schematic configuration of a welded part which the energy storage device of the embodiment has.

FIG. 3 is a side view showing the schematic configuration of the welded part 140 which the energy storage device 10 according to this embodiment has. In FIG. 3, a gas release vent 170 existing at a position deeper than the second welded part 142 is indicated by a broken line.

As shown in FIG. 3, the energy storage device 10 according to this embodiment includes the container 100 which has the container body 101, and the lid body 110 which closes the opening 102 of the container body 101. The elongated welded part 140 which is a welded portion between the container body 101 and the lid body 110 is formed on the container 100. The welded part 140 has the first welded parts 141 and the second welded part 142 arranged in a row in a lengthwise direction (the X axis direction in this embodiment) of the welded part 140, and a width W2 of the second welded part 142 in a widthwise direction (the Z axis direction in this embodiment) of the welded part 140 is set larger than a width W1 of the first welded part 141 in the Z axis direction. The gas release vent 170 is disposed on the lid body 110, and the second welded part 142 is disposed on a lateral side (a viewer's side in FIG. 3) of the gas release vent 170. A length L2 of the second welded part 142 in the X axis direction is set larger than a length L3 of the gas release vent 170 in the X axis direction.

As described above, in the container 100 according to this embodiment, the elongated welded part 140 has the first welded parts 141, and the second welded part 142 having the larger width than the first welded part 141. In this embodiment, the width W1 of the first welded parts 141 and the width W2 of the second welded part 142 are widths in the Z axis direction of welding marks which appear on a surface of the container 100 (in a direction along which the container body 101 and the lid body 110 are butted to each other). That is, the welded part 140 according to this embodiment is formed of the first welded parts 141 which can be formed at a relatively high speed; and the second welded part 142 where a melting amount of metal (per unit length, the same definition used in the description made hereinafter) is relatively large.

With such a configuration, for example, a joint strength between the container body 101 and the lid body 110 can be enhanced at least at a portion where the second welded part 142 exists. Accordingly, for example, it is possible to enhance reliability of joining of a portion of the lid body 110 which is liable to be affected by the increase of an internal pressure in the container 100 while suppressing lowering of efficiency of an entire welding operation.

To be more specific, as described above, for example, the gas release vent 170 is formed by reducing a wall thickness of a portion of a metal plate which is a material for forming the lid body 110. Accordingly, the portion of the lid body 110 where the gas release vent 170 is formed is a portion having lower rigidity than other portions of the lid body 110. Accordingly, such a portion is a portion which is liable to be affected by the increase of an internal pressure in the container 100. In the energy storage device 10 of this embodiment, the second welded part 142 which is formed with a large width and is longer than the gas release vent 170 is disposed on a lateral side of the gas release vent 170 and hence, resistance of the lid body 110 against the increase of an internal pressure in the container 100 can be enhanced. Accordingly, the energy storage device 10 of this embodiment is an energy storage device having high quality.

In the energy storage device 10 according to this embodiment, as shown in FIG. 3, the second welded part 142 is disposed at the position where the second welded part 142 covers the entire length of the gas release vent 170 in the X axis direction as viewed from the lateral side.

As described above, in this embodiment, the second welded part 142 exists on the entire region on the lateral side of the gas release vent 170. In other words, when the energy storage device 10 is viewed from a long-side surface side where the welded part 140 is formed, the entire length of the gas release vent 170 overlaps with the second welded part 142 in the X axis direction. That is, the second welded part 142 is formed over the entire region on the side of the portion of the lid body 110 having lower rigidity than other portions of the lid body 110 and hence, a force for fixing the portion of the lid body 110 to the container body 101 can be further enhanced. As a result, reliability of the container 100 is further enhanced.

Here, in the energy storage device 10, as shown in FIG. 3, assume the case where a length of the welded part 140 in the lengthwise direction (X axis direction) of the welded part 140 is set as L1, and a length of the second welded part 142 in the lengthwise direction of the welded part 140 is set as L2. In this case, L2 may be set to a value which falls within a range of from 0.2 L1 to 0.8 L1 inclusive. More preferably, L2 may be set to a value which falls within a range of from 0.2 L1 to 0.5 L1 inclusive.

With such a configuration, for example, a range of the second welded part 142 is limited to a portion where the further increase of a joint strength between the container body 101 and the lid body 110 is desirable such as a center portion of the elongated lid body 110. Accordingly, it is possible to acquire both the prevention of lowering of efficiency of an entire welding operation and the enhancement of reliability of the container 100.

As described above, the welded part 140 according to this embodiment is formed such that the width of the portion positioned on the lateral side of the gas release vent 170 becomes large. The welded part 140 having such a configuration is formed on the container 100 of the energy storage device 10 through welding steps described hereinafter, for example.

Figure 4:
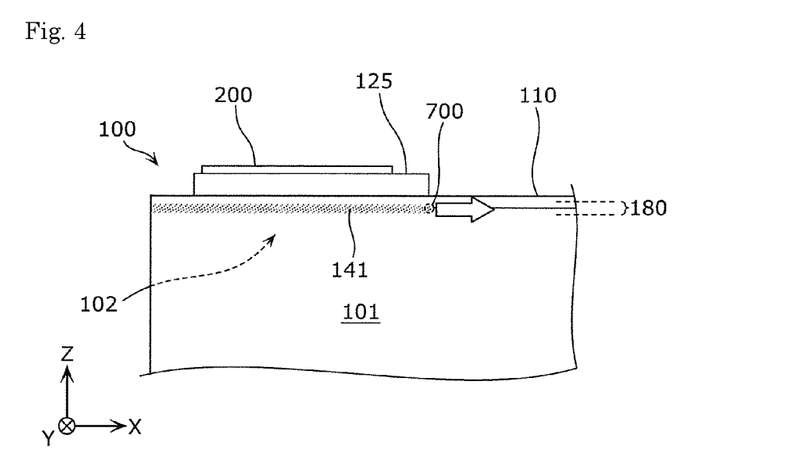
FIG. 4 is a view showing a step of forming a first welded part of the embodiment.
Figure 5:
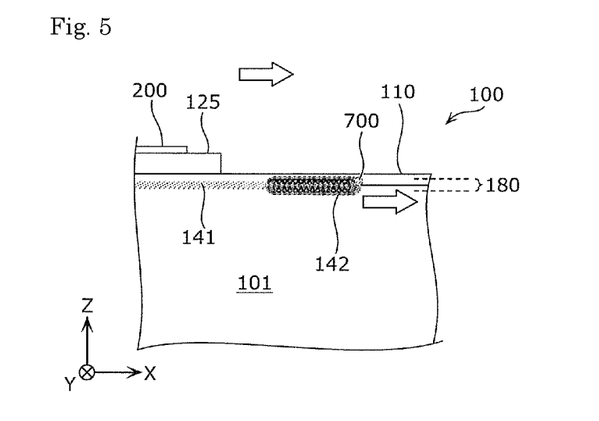
FIG. 5 is a view showing a step of forming a second welded part of the embodiment.
Figure 6:
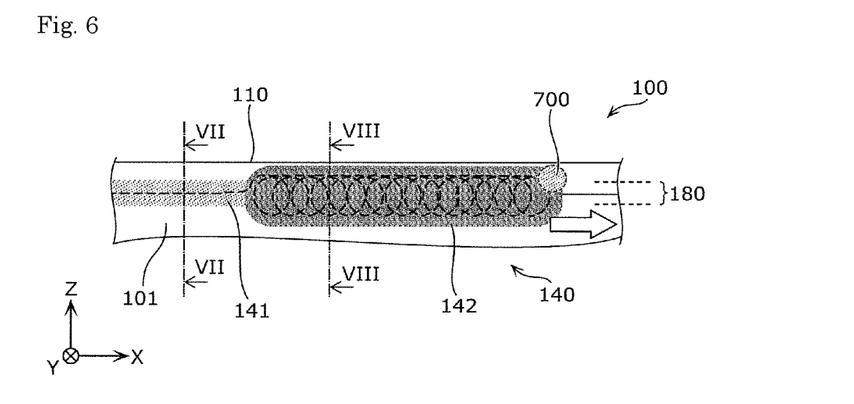
FIG. 6 is a view showing a portion of the configuration shown in FIG. 5 in an enlarged manner.

FIG. 4 is a view showing a step of forming the first welded part 141 according to this embodiment. FIG. 5 is a view showing a step of forming the second welded part 142 according to this embodiment. FIG. 6 is a view showing a portion of the configuration shown in FIG. 5 in an enlarged manner.

In this embodiment, as shown in FIG. 4, the first welded part 141 included in the welded part 140 is formed by advancing the irradiation position of a laser beam 700 relatively straightforward along a straight-line butting portion 180 formed between the container body 101 and the lid body 110. This step is expressed as "straight-line welding step", for example. The first welded part 141 is formed, for example, by fixing the container 100 and, then, by advancing the irradiation position of the laser beam 700 along the butting portion 180.

Then, as shown in FIG. 5, the second welded part 142 having a larger width than the first welded part 141 is formed. To be more specific, the second welded part 142 is formed by moving the irradiation position of the laser beam 700 along the butting portion 180 and, at the same time, by moving the irradiation position in the direction which intersects with the direction of moving of the irradiation position along the butting portion 180. This step is expressed as "non-straight-line welding step", for example.

In this embodiment, by rotating the irradiation position of the laser beam 700 about the Y axis while moving the irradiation position of the laser beam 700 in the X axis direction as shown in FIG. 6, the second welded part 142 having a larger width than the first welded part 141 is formed. Further, by performing welding while rotating the irradiation position of the laser beam 700 as described above, for example, a welding depth of the second welded part 142 (a width of the second welded part 142 in the Y axis direction) can be made uniform in the length direction of the second welded part 142. That is, irregularities in welding depth in the X axis direction can be decreased. With such a configuration, it is possible to enhance a joint strength between the container body 101 and the lid body 110 at the second welded part 142.

Figure 7:
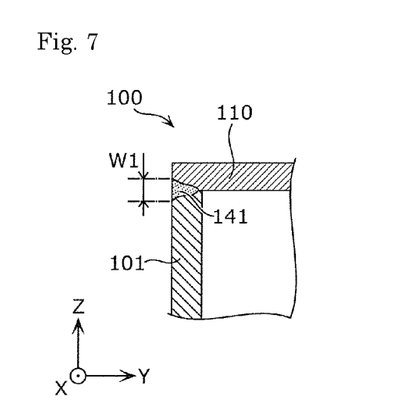
FIG. 7 is a cross-sectional view taken along a line VII-VII in FIG. 6.
Figure 8:
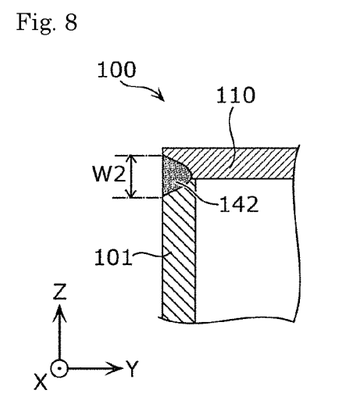
FIG. 8 is a cross-sectional view taken along a line VIII-VIII in FIG. 6.

FIG. 7 is a cross-sectional view taken along a line VII-VII in FIG. 6, and FIG. 8 is a cross-sectional view taken along a line VIII-VIII in FIG. 6. In FIG. 7 and FIG. 8, the illustration of constitutional elements housed in the container 100 such as the electrode assembly 400 is omitted. The omission of the illustration of the constitutional parts in the container 100 is made in FIG. 11 and FIG. 12 described later.

As shown in FIG. 7 and FIG. 8, the width W2 of the second welded part 142 is larger than the width W1 of the first welded part 141. This means that a melting amount of metal at the second welded part 142 is larger than a melting amount of metal at the first welded part 141. That is, the second welded part 142 is formed such that the joint strength between the container body 101 and the lid body 110 at the second welded part 142 is higher than the joint strength between the container body 101 and the lid body 110 at the first welded part 141.

As described above, the method of manufacturing the energy storage device 10 according to this embodiment includes the welding step of forming the welded part 140 which is a welded portion between the container body 101 and the lid body 110, and the welded part 140 includes the first welded part 141 and the second welded part 142 disposed in a row in a lengthwise direction of the welded part 140.

This welding step includes the straight-line welding step of forming the first welded part 141, and the non-straight-line welding step of forming the second welded part 142. In the straight-line welding step of forming the first welded part, the first welded part 141 is formed by advancing the irradiation position of the laser beam 700 relatively straightforward along the straight-line-shaped butting portion 180 between the container body 101 and the lid body 110. In the non-straight-line welding step of forming the second welded part 142, the second welded part 142 is formed by moving the irradiation position of the laser beam 700 along the butting portion 180 and, at the same time, by moving the irradiation position in the direction which intersects with the direction of moving of the irradiation position along the butting portion 180.

According to such a manufacturing method, it is possible to form the straight-line welded part 140 as a whole while forming a portion of the welded part 140 with a large width by changing the irradiation position of the laser beam 700 relative to the container 100. For example, the welded part 140 which includes the first welded part 141 and the second welded part 142 can be formed by a series of operation where the irradiation position of the laser beam 700 relative to the container 100 is controlled while continuing the irradiation of the laser beam 700 to the container 100 from a laser unit.

That is, the welded part 140 can be formed by a series of operations and, at the same time, the portion of the welded part 140 can be formed while increasing the joint strength of the portion compared to the joint strength of other portions. With such a configuration, it is possible to suppress the lowering of efficiency of the entire welding operation, and the portion of the lid body 110 having relatively low rigidity (the portion where the gas release vent 170 is disposed in this embodiment) can be firmly fixed to the container body 101. That is, it is possible to efficiently manufacture the energy storage device 10 having high quality.

Figure 9:
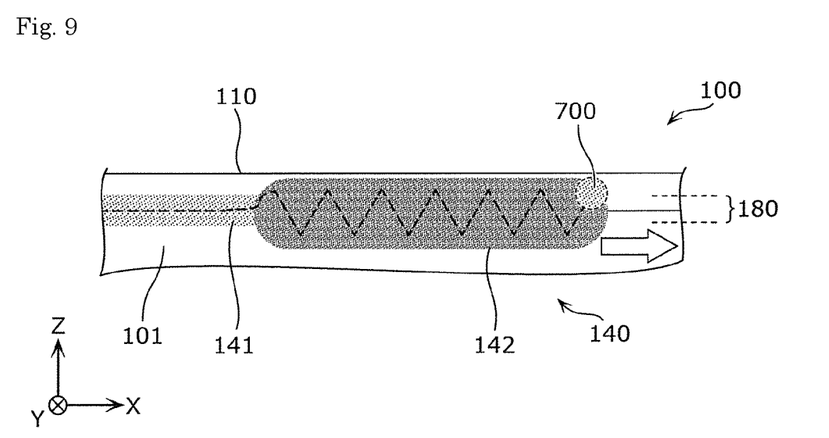
FIG. 9 is a view showing a first example of a welding method for forming the second welded part.
Figure 10:
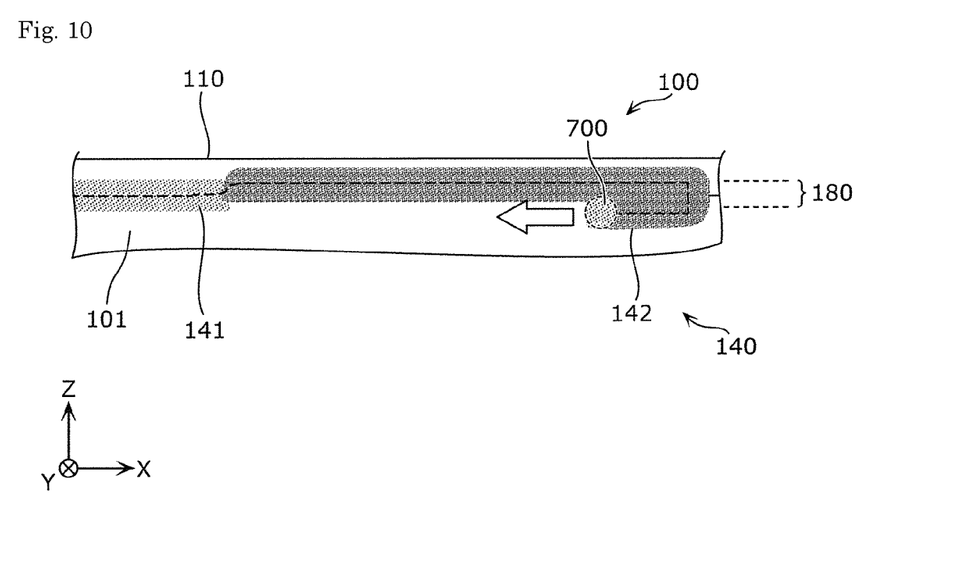
FIG. 10 is a view showing a second example of the welding method for forming the second welded part.

The second welded part 142 which the welded part 140 includes may be formed by a technique different from the technique shown in FIG. 6. FIG. 9 and FIG. 10 are views respectively showing examples relating to other techniques for forming the second welded part 142.

For example, as shown in FIG. 9, the second welded part 142 may be formed by irradiating a laser beam 700 to the butting portion 180 such that a trajectory of the irradiation position of the laser beam 700 forms a zigzag shape.

For example, as shown in FIG. 10, the second welded part 142 may be formed by moving the irradiation position of the laser beam 700 along the butting portion 180 and by turning back the irradiation position at a predetermined position. In this case, the position of the container 100 in the Z axis direction to which the laser beam 700 is irradiated differs before and after the turning back of the irradiation position. That is, after the turning back of the irradiation position, the laser beam 700 is not irradiated to the butting portion 180 doubly but the laser beam 700 is irradiated while displacing the irradiation position of the laser beam 700 in a direction which intersects with the main moving direction (X axis direction) of the irradiation position of the laser beam 700. Also with such an operation, the second welded part 142 having a larger width than the first welded part 141 can be formed.

Besides the above-mentioned methods, the second welded part 142 having a larger width than the first welded part 141 may be formed by irradiating a laser beam 700 to the butting portion 180 such that a trajectory of the irradiation position of the laser beam 700 forms a sinusoidal wave or a rectangular wave.

That is, within a range of the butting portion 180 where the second welded part 142 is to be formed, the irradiation position of the laser beam 700 is moved along the extending direction of the butting portion 180, and at least at a portion within the region, the irradiation position is moved in the direction which intersects with the moving direction of the irradiation position along the extending direction of the butting portion 180. With such an operation, it is possible to form the second welded part 142 having larger width than the first welded part 141 formed in the straight-line welding step.

For example, the second welded part 142 having a larger width than the first welded part 141 may be formed by changing a beam width (spot size) of the laser beam 700. For example, the first welded part 141 is formed by advancing the irradiation position of a laser beam 700 along the butting portion 180 and, then, when the irradiation position enters a range where the second welded part 142 is to be formed, the spot size of the laser beam 700 is increased and the irradiation position of the laser beam 700 is advanced straightforward so that the second welded part 142 is formed. The second welded part 142 having a larger width than the first welded part 141 may be formed as described above.

In this embodiment, the width W2 of the second welded part 142 in the Z axis direction is set larger than the width W1 of the first welded part 141 in the Z axis direction. However, it is sufficient that a width of the second welded part 142 in the widthwise direction in the welded part 140 is larger than a width of the first welded part 141 in the widthwise direction. That is, it is sufficient that the width of the second welded part 142 is larger than the width of the first welded part 141 in at least one of directions orthogonal to the lengthwise direction of the welded part 140.

Figure 11:
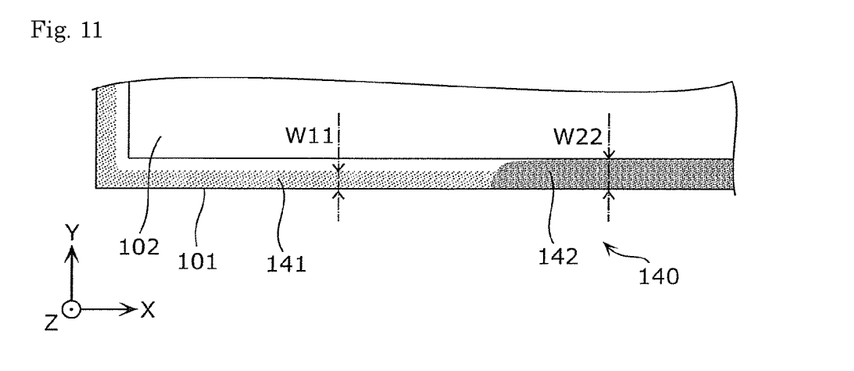
FIG. 11 is a view showing a first welded part and a second welded part which differ from each other in width in a wall thickness direction of a container body.

FIG. 11 is a view showing the first welded part 141 and the second welded part 142 which differ from each other in width in the wall thickness direction of the container body 101. In FIG. 11, the illustration of the lid body 110 is omitted.

A width of the first welded part 141 and a width of the second welded part 142 shown in FIG. 11 are defined as lengths in the wall thickness direction (Y-axis direction) of the container body 101 which is a direction intersecting with the lengthwise direction (X axis direction) of the welded part 140.

That is, in FIG. 11, a width W22 of the second welded part 142 in the Y axis direction is larger than a width W11 of the first welded part 141 in the Y axis direction. With such a configuration, a joint strength of the second welded part 142 can be relatively increased. As described above, by disposing the second welded part 142 on the lateral side of the gas release vent 170, and by setting a length of the second welded part 142 in the X axis direction longer than a length of the gas release vent 170 in the X axis direction, it is possible to acquire advantageous effects such as the enhancement of resistance of the lid body 110 against the increase of an internal pressure in the container 100 can be enhanced as described previously. A wall thickness of a portion of the container 100 corresponding to the first welded part 141 may be set larger than a wall thickness of a portion of the container 100 corresponding to the second welded part 142. With such a configuration, for example, the width W22 of the second welded part 142 in the Y axis direction can be further increased.

The first welded part 141 and the second welded part 142 shown in FIG. 11 may be formed by adjusting a strength of a laser beam 700, a moving speed of the laser beam 700 or the like, for example. For example, the first welded part 141 is formed by advancing an irradiation position of a laser beam 700 along the butting portion 180 at a predetermined speed and, thereafter, when the irradiation position of the laser beam 700 enters a region where the second welded part 142 is to be formed, the irradiation position of the laser beam 700 is advanced straightforward while lowering a moving speed thus forming the second welded part 142. The second welded part 142 having a larger width than the first welded part 141 may be formed in this manner.

(Other Embodiments)

The energy storage device according to the present invention has been described with reference to the embodiment and the modifications heretofore. However, the present invention is not limited to the above-mentioned embodiments and modifications. The configurations acquired by applying various modifications which those who are skilled in the art conceive to the previously-mentioned embodiments or modifications, and the configurations acquired by combining the plurality of constitutional elements described above fall within the scope of the present invention unless these configurations depart from the gist of the present invention.

For example, in the above-mentioned embodiments, the description has been made with respect to the welded part 140 which is formed on the long-side surface of the container 100 on a viewer's side (a minus side in the Y axis direction) in FIG. 1. However, a welded part 140 having the same configuration as the welded part 140 described above may be also formed on a long-side surface on a depth side in FIG. 1 (a plus side in the Y axis direction). That is, the second welded part 142 having a larger width than the first welded part 141 may be formed on both sides of the container 100 with the gas release vent 170 interposed therebetween. With such a configuration, resistance of the lid body 110 against the increase of an internal pressure in the container 100 can be further enhanced. In this case, widths of two second welded parts 142 may differ from each other corresponding to distances from the gas release vent 170 to the respective welded parts 142, for example.

Figure 12:
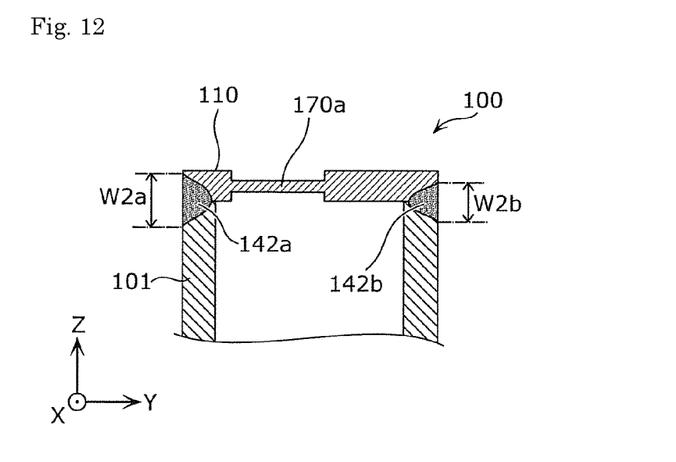
FIG. 12 is a partially cross-sectional view of a container having a gas release vent disposed closer to one of two long-side surfaces of the container.

FIG. 12 is a partially cross-sectional view of a container 100 having a gas release vent 170a disposed closer to one of two long-side surfaces of the container 100.

For example, as shown in FIG. 12, when the gas release vent 170a is disposed at a position close to a left side of a lid body 110, a width W2a of a second welded part 142a which is formed on a left long-side surface side may be set larger than a width W2b of the second welded part 142b which is formed on a right long-side surface side.

With such a configuration, for example, a portion of the lid body 110 where rigidity is lowered due to the existence of the gas release vent 170a can be reinforced more effectively.

In this embodiment, as shown in FIG. 2 and FIG. 3, the gas release vent 170 is disposed at a center portion of the lid body 110 in the lengthwise direction of the lid body 110, and the second welded part 142 is disposed at a center portion of the welded part 140 corresponding to the gas release vent 170. However, the position of the gas release vent 170 in the lengthwise direction of the lid body 110 is not limited to the center portion, and the gas release vent 170 may be disposed at an end portion of the lid body 110 in the lengthwise direction of the lid body 110.

For example, in the case where the gas release vent 170 is disposed on a left end portion of the lid body 110 when the container 100 is viewed from a long-side surface side, the straight-line welded part 140 may have: the second welded part 142 which extends to a position beyond the gas release vent 170 from a left end of the lid body 110; and a first welded part 141 which extends to a right end of the lid body 110 on a right side of the second welded part 142. With such a configuration, the left end portion of the lid body 110 where rigidity is lowered due to existence of the gas release vent 170 can be effectively reinforced.

It is not always necessary that the width W1 of the first welded part 141 and the width W2 of the second welded part 142 are respectively set to a fixed value in a length direction. For example, in the welded part 140 elongated in the X axis direction, a maximum value or an average value of widths of the first welded part 141 in the Z axis direction or in the Y axis direction may be defined as a width W1 of the first welded part 141. The same goes for the second welded part 142. The first welded part 141 and the second welded part 142 may be differentiated from each other based on the difference in an irradiation mode of a laser beam 700 (a moving speed, a moving trajectory, a spot size of an irradiation position of the laser beam 700, intensity of the laser beam 700 or the like), for example.

For example, the welded part 140 is divided into plural sections for respective predetermined lengths by zoning, an average value of a width in the Z axis direction or in the Y axis direction is obtained for every section, and the section where the average value is larger than a threshold value may be defined as the second welded part 142, and a section where the average value is equal to or less than the threshold value may be defined as the first welded part 141.

A posture of the winding-type electrode assembly 400 which the energy storage device 10 includes is not particularly limited. For example, the electrode assembly 400 may be housed in the container body 101 in a posture that a winding axis is arranged parallel to the lengthwise direction (X axis direction) of the lid body 110.

An electrode assembly which the energy storage device 10 includes is not limited to a winding type electrode assembly. The energy storage device 10 may include a stacking-type electrode assembly formed by stacking planar electrode plates, or may include an electrode assembly formed by stacking elongated-strip electrode plates in a bellows shape by repeating mounting folding and valley folding, for example.

INDUSTRIAL APPLICABILITY

The present invention is applicable to an energy storage device such as a lithium ion secondary battery, a manufacturing method for manufacturing such an energy storage device and the like.

DESCRIPTION OF REFERENCE SIGNS

10: energy storage device
100: container
101: container body

102: opening
110: lid body
125, 135: gasket
140: welded part
141: first welded part
142, 142a, 142b: second welded part
170, 170a: gas release vent
180: butting portion
200: positive electrode terminal
300: negative electrode terminal
400: electrode assembly
700: laser beam

The invention claimed is:

1. An energy storage device equipped with a container having a container body and a lid body which closes an opening of the container body, wherein
   an elongated welded part which is a welded portion between the container body and the lid body is formed on the container,
   the welded part has a first welded part and a second welded part arranged in a row in a lengthwise direction of the welded part,
   a width of the second welded part in a widthwise direction of the welded part is set larger than a width of the first welded part in the widthwise direction,
   a gas release vent is disposed on the lid body,
   the second welded part is disposed on a lateral side of the gas release vent, and
   a length of the second welded part in the lengthwise direction is set larger than a length of the gas release vent in the lengthwise direction.

2. The energy storage device according to claim 1, wherein the second welded part is disposed at a position where the second welded part includes an entire length of the gas release vent in the lengthwise direction as viewed from the lateral side.

3. The energy storage device according to claim 1, wherein assuming a length of the welded part in the lengthwise direction as L, a length of the second welded part is set to a value which falls within a range of from 0.2 L to 0.8 L, inclusive.

4. A method of manufacturing an energy storage device equipped with a container having a container body and a lid body which closes an opening of the container body, the method comprising a welding of forming a welded part which comprises a welded portion between the container body and the lid body and includes a first welded part and a second welded part disposed in a row in a lengthwise direction of the welded part,
   wherein the welding comprises:
   forming the first welded part by advancing an irradiation position of a laser beam relatively straightforward along a straight-line-shaped butting portion between the container body and the lid body; and
   forming the second welded part by moving the irradiation position of the laser beam along the butting portion and, at the same time, by moving the irradiation position in a direction which intersects with a direction of moving of the irradiation position along the butting portion.

* * * * *